(12) United States Patent
Nagano et al.

(10) Patent No.: US 7,774,164 B2
(45) Date of Patent: *Aug. 10, 2010

(54) PERFORMANCE PREDICTION PROGRAM AND PERFORMANCE PREDICTION SYSTEM FOR GROUND SOURCE HEAT PUMP SYSTEM

(75) Inventors: Katsunori Nagano, Sapporo (JP); Takao Katsura, Sapporo (JP)

(73) Assignees: National University Corporation Hokkaido University, Hokkaido (JP); Nippon Steel Engineering Co., Ltd., Tokyo (JP)

( * ) Notice: Subject to any disclaimer, the term of this patent is extended or adjusted under 35 U.S.C. 154(b) by 860 days.

This patent is subject to a terminal disclaimer.

(21) Appl. No.: 11/511,834

(22) Filed: Aug. 29, 2006

(65) Prior Publication Data

US 2007/0061104 A1  Mar. 15, 2007

Related U.S. Application Data

(63) Continuation-in-part of application No. 11/084,762, filed on Mar. 18, 2005, now Pat. No. 7,113,888.

(30) Foreign Application Priority Data

Sep. 21, 2005  (JP)  ............................. 2005-274768

(51) Int. Cl.
G06F 11/30  (2006.01)
(52) U.S. Cl. ...................... 702/182; 702/181; 702/183; 702/184; 702/185; 702/188; 374/10; 374/12; 374/100; 374/135; 374/136; 374/141; 374/142; 374/118
(58) Field of Classification Search ......... 702/181–185, 702/188; 374/10, 12, 100, 135, 136, 141, 374/142, 118
See application file for complete search history.

(56) References Cited

U.S. PATENT DOCUMENTS 4,379,483 A   4/1983  Farley
6,250,371 B1 *  6/2001  Amerman et al. ............. 165/45

FOREIGN PATENT DOCUMENTS

JP      2001-289533      10/2001

OTHER PUBLICATIONS

Nagano et al., "Development of a design and performance prediction tool for the ground source heat pump system," Applied Thermal Engineering, Jan. 26, 2006.*

(Continued)

*Primary Examiner*—Sujoy K Kundu
*Assistant Examiner*—Hyun Park
(74) *Attorney, Agent, or Firm*—William L. Androlia; H. Henry Koda

(57) ABSTRACT

A computer which functions by a performance prediction program for a ground source heat pump system of the present invention and a performance prediction system constructed thereby include a dimensionless distance calculating means, a first dimensionless time calculating means, a second dimensionless time calculating means, a boundary time acquiring means, an underground temperature change calculating means, and a tube surface temperature change calculating means. The performance prediction program and performance prediction system can be applied to the design of heat exchange system by obtaining predicted underground temperature data for the ground source heat pump system with high accuracy and predicting the performance for the ground source heat pump system based on the resulting underground temperature changes, etc., in view of the use of a plurality of buried tubes, underground temperature change patterns for buried tubes placed at different intervals, and the use of U-shaped tube heat exchangers.

8 Claims, 13 Drawing Sheets

OTHER PUBLICATIONS

Lamarche et al., "New Solutions for the short-lived analysis of geothermal vertical boreholes," International Journal of Heat and Mass Transfer 50, Nov. 2006.*

Vadasz et al., "Extending the Duhamel theorem to dual phase applications," International Journal of Heat and Mass transfer, 51, 2007.*

* cited by examiner

FIG.5
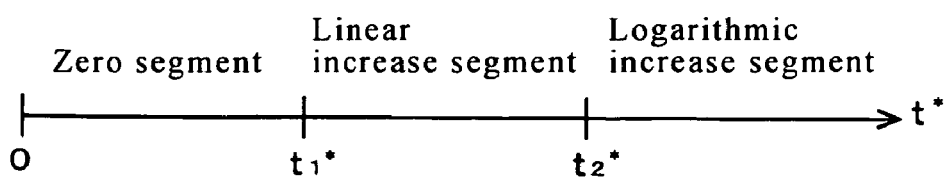
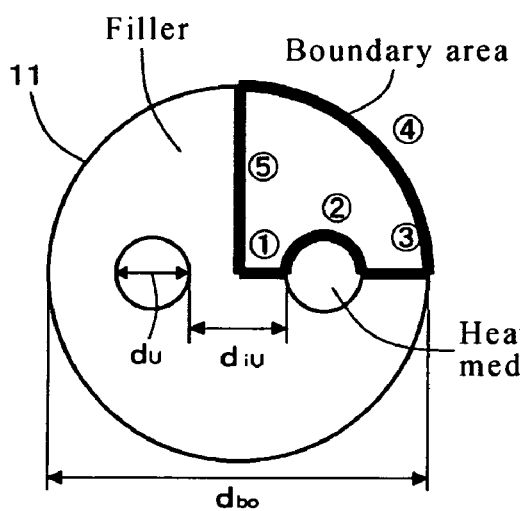
FIG.6A
Single U-shaped tube
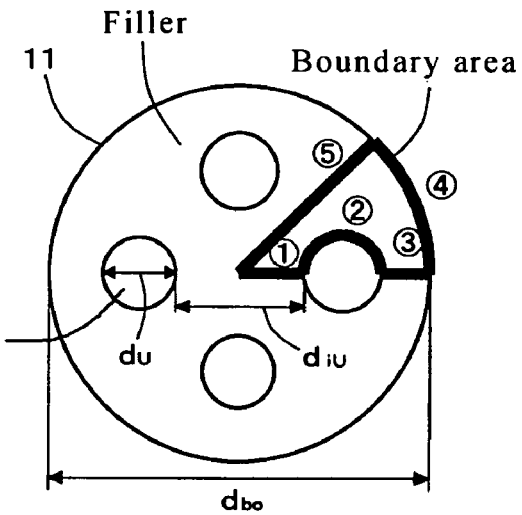
FIG.6B
Double U-shaped tube

FIG.7

| | $d_U$[mm] | $d_{bo}$[mm] | $d_{iU}$[mm] |
|---|---|---|---|
| Calculation condition 1 | 32 | 120 | 20 |
| Calculation condition 2 | | | 30 |
| Calculation condition 3 | | | 40 |
| Calculation condition 4 | 32 | 100 | 20 |
| Calculation condition 5 | | 120 | |
| Calculation condition 6 | | 150 | |
| Calculation condition 7 | 32 | 120 | 20 |
| Calculation condition 8 | 20 | | 30 |
| Calculation condition 9 | 44 | | 40 |

FIG.8

| Calculation condition | Thermal resistance[mK/W] | |
|---|---|---|
| | Single U-shaped tube | Double U-shaped tube |
| 1 | 0.191 | 0.258 |
| 2 | 0.150 | 0.187 |
| 3 | 0.102 | 0.117 |
| 4 | 0.100 | 0.119 |
| 6 | 0.280 | 0.417 |
| 8 | 0.320 | 0.478 |
| 9 | 0.061 | 0.068 |

Single U-shaped tube

Double U-shaped tube

|  | Example 1 | Example 2 | Example 3 |
|---|---|---|---|
| Heating period | From October through May | | |
| Cooling period | From June through September | | |
| Amount of heat absorption in winter [GJ] | 33 | | |
| Amount of heat discharge in summer [GJ] | 3 | | |
| Amount of heat discharge in September and October [GJ] | — | — | Each 5 |
| Heat exchanger | Foundation pillar | Single U-shaped tube | Foundation pillar |
| Length and number | 8m × 20 | 80m × 2 | 8m × 20 |
| Diameter[m] | 0.175 | 0.12 | 0.175 |
| Interval[m] | 2 | 2 | 2 |
| Soil density[kg/m3] | 1500 | | |
| Soil specific heat[kJ/(kg·K)] | 2.0 | | |
| Coefficient of thermal conductivity [W/(m·K)] | 1.0 | | |
| Temperature of temperature-immutable soil layer [°C] | 10.4 | | |

FIG.14

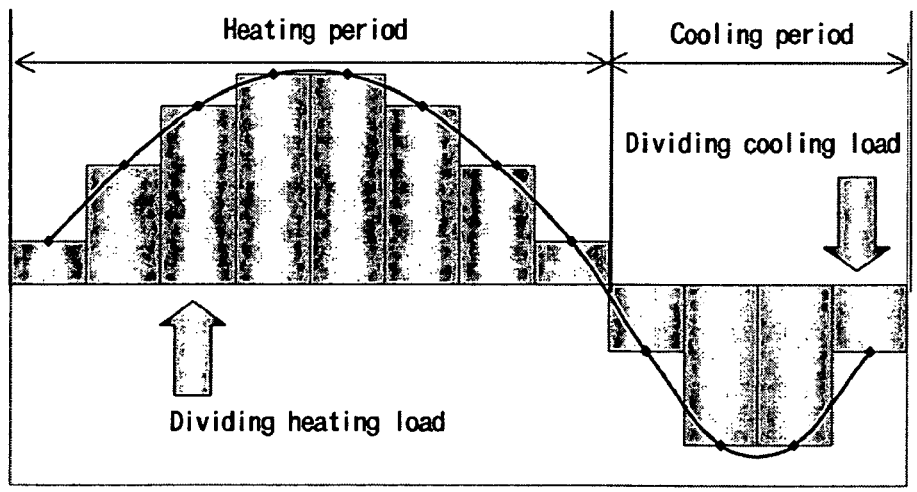

PERFORMANCE PREDICTION PROGRAM AND PERFORMANCE PREDICTION SYSTEM FOR GROUND SOURCE HEAT PUMP SYSTEM

This is a Continuation-In-Part Application of application Ser. No. 11/084,762, filed Mar. 18, 2005.

BACKGROUND OF THE INVENTION

1. Field of the Invention

The present invention relates generally to a performance prediction program and performance prediction system for a ground source heat pump system using ground heat, and more particularly to a performance prediction program and performance prediction system which is suitable for use in performance prediction for a ground source heat pump system which employs a plurality of buried tubes or U-shaped tube heat exchangers in a heat exchange system.

2. Description of the Related Art

Ground source heat pump systems, characterized by the use of renewable energy sources not affected by weather conditions and environmentally-friendly technology of no waste heat dissipation, have been attracting considerable attention. Under the circumstances, these systems are increasingly used, primarily in Europe and the United States. A conventional ground source heat pump system, as disclosed in Japanese Unexamined Patent Publication No. 2001-289533, comprises a U-shaped buried tube placed into a borehole in the ground as a heat exchanger and a heat pump mounted on the ground, in which an antifreeze is circulated through the buried tube, to provide efficient heating and cooling by heat absorption and discharge with the ground.

Preferably, for installing the above mentioned ground source heat pump system with high installation costs, the heat exchanger has the dimensions, number of units and layout based on an individual and specific design to achieve high system performance, energy-saving and low-cost advantages. This conventional ground source heat pump system is prone, however, to several shortcomings. First, since conventional researches focus exclusively on the development of system structure to make the ground source heat pump more efficient, system evaluation techniques, in which performance for a proposed system can be predicted to provide a comprehensive equipment evaluation and thus improve system design, has not been established. Due to this shortcoming, conventional construction approaches have a problem of setting a higher safety factor, sorely based on previous construction experiences for system design and works execution.

Meanwhile, performance prediction for a ground source heat pump system requires a comprehensive equipment evaluation based on analytical data, such as system efficiency, power consumption, underground temperature, amount of carbon-dioxide emission, running costs and life cycle. There is another difficulty in obtaining other basic data for such a comprehensive evaluation, e.g. underground temperature and its change. In a more specific manner, the use of a large number of buried tubes in a ground source heat pump system, aimed at promoting heat absorption and discharge between heat exchangers and the ground, will significantly affect underground temperature patterns by a long-term heat transfer, thereby causing a difficult calculation on its underground temperature change. Moreover, the impact of a plurality of buried tubes, in view of the alignment thereof at different intervals, on soil temperature change, must be examined as well.

For example, the use of a steel-pipe well type heat exchanger can facilitate heat transfer analysis due to a property thereof as a hollow circular cylinder. But, the above mentioned ground source heat pump system employs various shapes of heat exchangers such as single U-shaped tube and double U-shaped tube, thus it is hard to precisely calculate thermal resistance required for calculating system efficiency.

SUMMARY OF THE INVENTION

It is, therefore, one object of the present invention to solve the aforementioned problems by providing a performance prediction program and performance prediction system for a ground source heat pump system which can be applied to the design of heat exchange system by obtaining predicted underground temperature data for the ground source heat pump system with high accuracy and predicting the performance for the ground source heat pump system based on the resulting underground temperature changes, etc., in view of the use of a plurality of buried tubes, underground temperature change patterns for buried tubes placed at different intervals, and the use of U-shaped tube heat exchangers.

The performance prediction program and performance prediction system for the ground source heat pump system of the present invention is characterized by performance prediction for the ground source heat pump system having a plurality of buried tubes as heat exchangers, a computer functioning by the program, in which the computer comprises:

a dimensionless distance calculating means for calculating a dimensionless distance ($r^*$) by non-dimensionalizing a radial distance (r) from one of said plurality of buried tubes using the following expression (1);

$$r^* = \frac{r}{r_p} \qquad \text{expression (1)}$$

where $r_p$: radius of buried tube
r: radial distance from buried tube a first dimensionless time calculating means for non-dimensionalizing the following expression (2) using a dimensionless time ($t^*$) equal to $a_s t/r_p^2$ obtained by non-dimensionalizing an elapsed time (t) and using a dimensionless temperature ($T_s^*$) equal to $\lambda_s \Delta T/(r_p \cdot q_{const})$ obtained by non-dimensionalizing an underground temperature change ($\Delta T_s$) at $t^*$ under the condition of a constant heat flux of $q_{const}$ when said underground temperature change generated by the change in heat flux (q(t)) on a surface of a predetermined one of said plurality of buried tubes for any distance (r) therefrom within said elapsed time is given by said expression (2) obtained by superposition principle of Duhamel's theorem, and for calculating a first dimensionless time ($t_1^*$) bounded by a zero segment in which said dimensionless temperature shows no change for said dimensionless distance and a linear increase segment in which said dimensionless temperature linearly increases for said dimensionless time;

$$\Delta T_s(r, t) = -\frac{2}{\pi \lambda_s} \int_0^t q(t-\tau) \frac{\partial I(r, \tau)}{\partial \tau} d\tau \qquad \text{expression (2)}$$

where $$I(r, t) = \int_0^\infty \left(1 - e^{-a_s u^2 t}\right) \frac{J_0(ur) Y_1(ur_p) - Y_0(ur) J_1(ur_p)}{u^2 [J_1^2(ur_p) + Y_1^2(ur_p)]} du$$

$a_s$: thermal diffusivity of the soil
q: heat flux on the surface of buried tube
$\lambda_s$: thermal conductivity of the soil
u: eigenvalue
$J_X$: the X root of the Bessel function of the first kind
$Y_X$: the X root of the Bessel function of the second kind
τ: time variant a second dimensionless time calculating means for calculating a second dimensionless time ($t_2^*$) bounded by a logarithmic increase segment in which said dimensionless temperature for said dimensionless distance logarithmically increases and said linear increase segment;

a boundary time acquiring means for obtaining an elapsed time corresponding to said first dimensionless time as a first boundary time (t') and an elapsed time corresponding to said second dimensionless time as a second boundary time (t");

an underground temperature change calculating means for acquiring said first boundary time and said second boundary time, and for calculating said underground temperature change at any point for said plurality of buried tubes by the following approximate expressions (3) to (5); and where $t < t'$      expression (3)

$$\Delta T_s(r, t) = -\frac{2}{\pi \lambda_s} \int_0^t q(t-\tau) \frac{\partial I(r, \tau)}{\partial \tau} d\tau \cong 0$$

where $t' \leq t < t''$      expression (4)

$$\Delta T_s(r, t) = -\frac{2}{\pi \lambda_s} \int_0^{t'} q(t-\tau) \frac{\partial I(r, \tau)}{\partial \tau} d\tau - \frac{2}{\pi \lambda_s} \int_{t'}^t q(t-\tau) \frac{\partial I(r, \tau)}{\partial \tau} d\tau$$

$$\cong \frac{r_p}{\lambda_s(t-t')} \frac{t-t'}{t''-t'} T_s^*(r^*, t_2^*) \int_{t'}^{t''} q(t-\tau) d\tau$$

where $t \geq t''$      expression (5)

$$\Delta T_s(r, t) = -\frac{2}{\pi \lambda_s} \int_0^{t'} q(t-\tau) \frac{\partial I(r, \tau)}{\partial \tau} d\tau - \frac{2}{\pi \lambda_s} \int_{t'}^{t''} q(t-\tau) \frac{\partial I(r, \tau)}{\partial \tau} d\tau - \frac{2}{\pi \lambda_s} \int_{t''}^t q(t-\tau) \frac{\partial I(r, \tau)}{\partial \tau} d\tau$$

$$\cong \frac{r_p}{\lambda_s(t''-t')} T_s^*(r^*, t_2^*) \int_{t'}^{t''} q(t-\tau) d\tau +$$

$$\frac{r_p}{\lambda_s} \int_{t_2^*}^{t^*} q(t^* - \tau^*) \frac{\partial T_s^*(1, \tau^*)}{\partial \tau^*} dt$$

a tube surface temperature change calculating means for calculating an underground temperature change on a surface of said plurality of buried tubes by a summation of said underground temperature changes for respective buried tubes.

Preferably in this invention, said first dimensionless time calculating means may acquire said first dimensionless time $t_1^*$ in an approximate manner based on the following approximate expression (6).

$$T_s^*(r^*, t_1^*) \cong 2.8 \exp(-1.73 t_1^{*-0.51} r^*) \quad \text{expression (6)}$$

Furthermore, in this invention, said first dimensionless time calculating means may directly acquire said first dimensionless time ($t_1^*$) in an approximate manner based on the following expression (7).

$$t_1^* = 0.05 r^{*2} \quad \text{expression (7)}$$

Moreover, in this invention, said second dimensionless time calculating means may acquire said second dimensionless time ($t_2^*$) in an approximate manner based on the following approximate expression (8).

$$T_s^*(r^*, t_2^*) \cong -\ln(r^*) + T_s^*(1, t_2^*) \quad \text{expression (8)}$$

Furthermore, in this invention, said second dimensionless time calculating means may directly acquire said second dimensionless time ($t_2^*$) in an approximate manner based on the following expression (9).

$$t_2^* = 1.0 r^{*2} \quad \text{expression (9)}$$

In the present invention, if said heat exchangers are U-shaped tube heat exchangers, the heat flux (q) on a surface of said buried tube is calculated based on the following expression (10).

$$q = K_p (T_s |_{r=r_p} - T_b) \quad \text{expression (10)}$$

where $$K_p = \frac{1}{\left( R_{bo} + \frac{A_{bo}}{A_{u2}} r_{u2} \left( \frac{1}{\lambda_u} \ln \frac{r_{u2}}{r_{u1}} + \frac{1}{r_{u1} h_b} \right) \right)}$$

$T_s|_{r=r_p}$: underground temperature on a surface of buried tube
$T_b$: temperature of heating medium
$A_{u2}$: outer surface area of U-shaped tube
$A_{bo}$: surface area of borehole
$R_{bo}$: thermal resistance within borehole
$r_{u1}$: internal radius of U-shaped tube
$r_{u2}$: external radius of U-shaped tube
$h_b$: convective heat transfer coefficient of heating medium
$\lambda_u$: thermal conductivity of U-shaped tube Accordingly, it is, of course, that even if heat exchangers for the ground source heat pump system comprise a plurality of buried tubes or U-shaped tube heat exchangers, this invention can precisely calculate an underground temperature in view of such distinct system properties, and determine proper dimensions, number of units and layout for a heat exchanger by predicting the performance for the ground source heat pump system, based on underground temperature change patterns, etc.

BRIEF DESCRIPTION OF THE DRAWINGS

The above and other objects of the invention will be seen by reference to the description taken in connection with the accompanying drawings, in which:

FIG. 5 is a diagram of this embodiment illustrating the relationship between each segment and a dimensionless time;

FIG. 6A is a sectional view of this embodiment illustrating a borehole for a single U-shaped tube heat exchanger;

FIG. 6B is a sectional view of this embodiment illustrating a borehole for a double U-shaped tube heat exchanger;

FIG. 7 is a table describing the calculation conditions for calculating thermal resistance in the borehole of this embodiment;

FIG. 8 is a table describing the results of thermal resistance calculation under the calculation conditions as shown in FIG. 7;

FIG. 12 is an image diagram showing the data entry screen for the performance prediction program of this embodiment;

FIG. 13 is a table describing the calculation conditions for the examples 1 to 3;

FIG. 14 is a diagram showing amounts of heat absorption and discharge distributed by month for the examples 1 to 3.

DETAILED DESCRIPTION OF THE INVENTION

A preferred embodiment of a performance prediction system 1 executed by a performance prediction program according to the present invention will be described with reference to the accompanying drawings.

Figure 1:
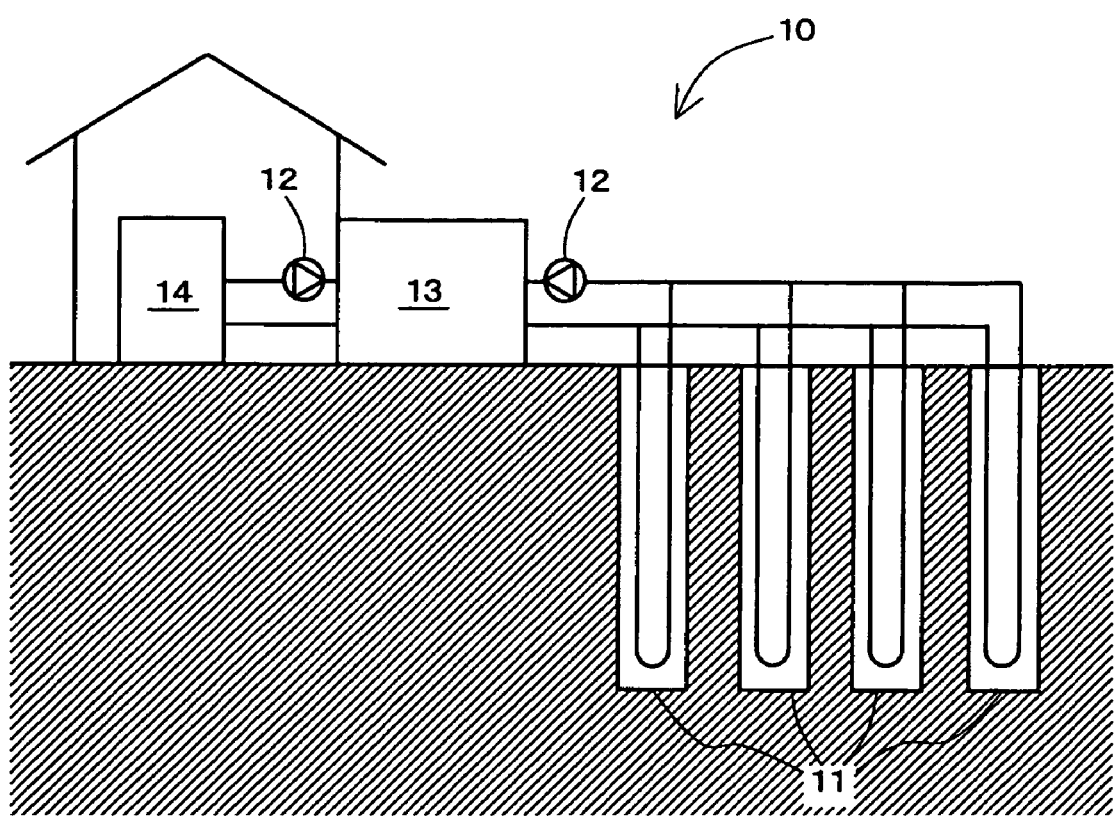
FIG. 1 is a schematic diagram of the structure of the ground source heat pump system according to the present invention.

FIG. 1 is a schematic diagram of this embodiment illustrating the structure of a ground source heat pump system 10 for performance prediction.

As shown in FIG. 1, the ground source heat pump system 10 comprises a plurality of buried tubes 11 as heat exchangers installed in the ground, a circulating pump 12 which circulates a heating medium through the plurality of buried tubes 11, a heat pump 13 which performs heat absorption and discharge with the ground through the heating medium circulated by the circulating pump 12, and an indoor air conditioner 14 which heats or cools the room through the heating medium being heated or cooled by the heat pump 13.

Figure 2:
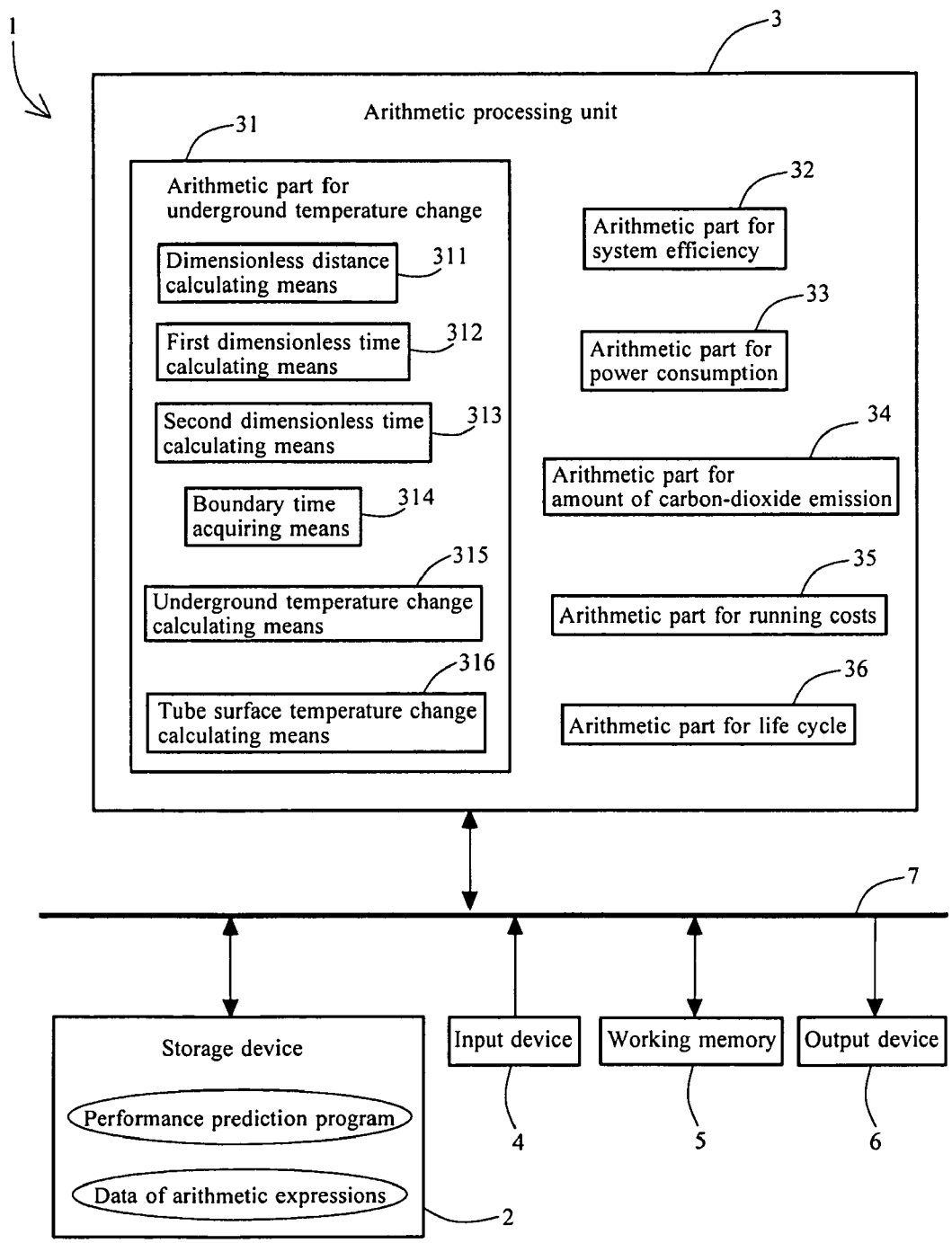
FIG. 2 is a block schematic diagram of the performance prediction system for the ground source heat pump system according to the present invention.

Next, the performance prediction system 1 of this embodiment will be explained referring to a block schematic diagram as shown in FIG. 2. The performance prediction system 1 of this embodiment, which calculates data required for predicting the performance for the aforementioned ground source heat pump system 10, essentially comprises a storage device 2 which stores the performance prediction program of this embodiment and arithmetic expressions, an arithmetic processing unit 3 which controls each component part thereof and performs arithmetic processing, an input device 4 to input data, a working memory 5 which temporarily stores data and serves arithmetic processing by the arithmetic processing unit 3, and an output device 6 which outputs the results of calculation, all of which are interconnected by a bus 7 for data communication.

Here, each component part of respective devices will be described in further detail. The storage device 2, which comprises, for example, read only memories (ROMs), stores the performance prediction program of this embodiment and data for arithmetic expressions.

The arithmetic processing unit 3 comprises central processing units (CPU) and other devices to control each component part of the performance prediction system 1, based on the performance prediction program stored in the storage device 2. As shown in FIG. 2, the arithmetic processing unit 3 of this embodiment comprises an arithmetic part for underground temperature change 31, an arithmetic part for system efficiency 32, an arithmetic part for power consumption 33, an arithmetic part for amount of carbon-dioxide emission 34, an arithmetic part for running costs 35 and an arithmetic part for life cycle 36 according to respective functions, which execute arithmetic processing to be described later.

Each component part of the arithmetic processing unit 3 will be described in further detail. The arithmetic part for underground temperature change 31, which calculates an underground temperature on a surface of one of said plurality of buried tubes 11 in the aforementioned ground source heat pump system 10, comprises a dimensionless distance calculating means 311, a first dimensionless time calculating means 312, a second dimensionless time calculating means 313, a boundary time acquiring means 314, an underground temperature change calculating means 315 and a tube surface temperature change calculating means 316.

Figure 3:
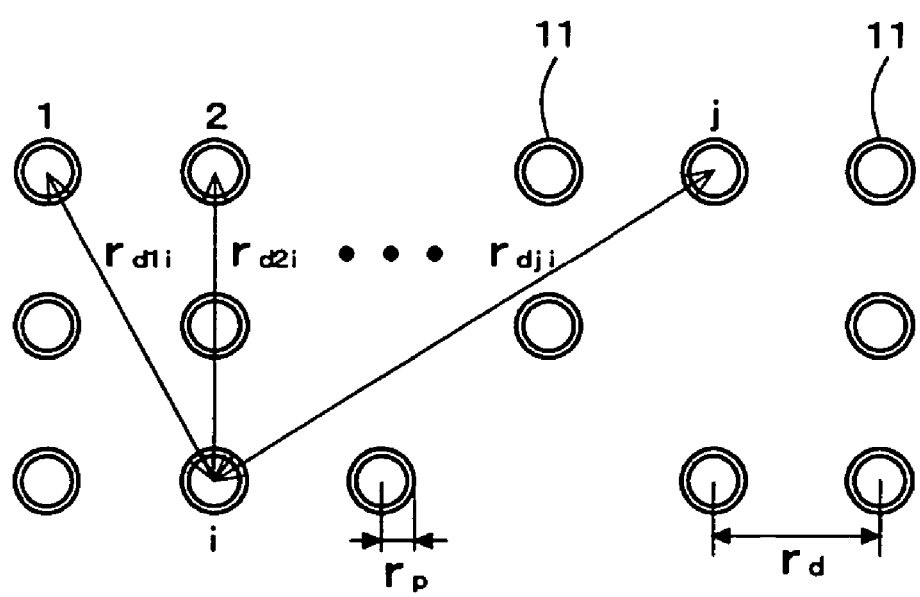
FIG. 3 is a diagram of this embodiment illustrating the alignment of a plurality of buried tubes.

Here, the calculation performed by each component means of the arithmetic part for underground temperature change 31 will be described in further detail. As shown in FIG. 3, the ground source heat pump system 10 is provided with a plurality of buried tubes 11 (n pieces) randomly arranged, with a radius of $r_p$, including a buried tube 11 for calculating an underground temperature change ($\Delta T_s$) on a surface thereof defined as i and another buried tube 11 for superposing such temperature changes defined as j. Supposing that a heat flux ($q_j(t)$) is generated from a surface of said buried tube j and a distance ($r_d$) between said buried tubes is sufficiently larger than a radius ($r_p$) of any buried tube 11, an underground temperature change ($\Delta T_{si}$) on a surface of any buried tube (i) is given by the following expression (11), using superposition principle in space.

$$\Delta T_{si}(r_p, t) = \sum_{j=1}^{n} \Delta T_s(r_{dji}, t) \quad \text{expression (11)}$$

when $i = j$, $r_{dji} = r_p$

Here, $r_{dji}$ is a distance (in meter) between one of said plurality of buried tubes (i) for calculating an underground temperature change ($\Delta T_s$) on a surface of the buried tube and another buried tube (j) for superposing such temperature changes, and t is elapsed time (in hour).

The underground temperature change ($\Delta T_s$) on a surface of any buried tube in the above expression (11) can be determined by substituting for $q_j(t)$ and $r_{dji}$ in q(t) and r in the following expression (2), respectively.

$$\Delta T_s(r,t) = -\frac{2}{\pi \lambda_s} \int_0^t q(t-\tau) \frac{\partial I(r,\tau)}{\partial \tau} d\tau \qquad \text{expression (2)}$$

where $$I(r,t) = \int_0^\infty (1 - e^{-a_s u^2 t}) \frac{J_0(ur) Y_1(ur_p) - Y_0(ur) J_1(ur_p)}{u^2 [J_1^2(ur_p) + Y_1^2(ur_p)]} du$$

$a_s$: thermal diffusivity of the soil q: heat flux on the surface of buried tube $\lambda_s$: thermal conductivity of the soil u: eigenvalue $J_X$: the X root of the Bessel function of the first kind $Y_X$: the X root of the Bessel function of the second kind $\tau$: time variant Here, the expression (2) is obtained by superposing underground temperature changes ($\Delta T_s$) for a heat flux (q(t)) on a surface of a predetermined one of said plurality of buried tubes for a distance of r therefrom within an elapsed time, based on Duhamel's theorem. q is heat flux on a surface of the predetermined buried tube [W/m²], $\lambda_s$ is thermal conductivity of U-shaped tube [W/(m·k)], $a_s$ is thermometric conductivity [m²/s], u is solution to eigenfunction required for determining theoretical solution in thermal conduction, $J_X$ is the X root of the Bessel function of the first kind, $Y_X$ is the X root of the Bessel function of the second kind and $\tau$ is time variant.

However, the determination of $I(r_{dji}, t)$ for calculating an underground temperature change ($\Delta T_s$) on a surface of any buried tube using the above expression (2) requires a significantly long time. Then, a methods for calculating of $I(r_{dji}, t)$ in an approximate and efficient manner and in a short period of time will be described. Prior thereto, a methods for approximately calculating a dimensionless temperature ($T_s^*$) equal to $\lambda_s \Delta T_s / (r_p \cdot q_{const})$ for the change in Fourier number ($t^*$) equal to $a_s t / r_p^2$ for a predetermined dimensionless distance ($r^*$) equal to $r/r_p$ will be described under the condition of a constant heat flux of $q_{const}$ generated on a surface of any buried tube. The Laplace transform of a partial differential equation of thermal conductivity gives a theoretical equation describing heat flux response theory on a surface of an infinite cylinder as shown in the following expression (12). In this expression (12), by introducing a dimensionless distance ($r^*$), a Fourier number ($t^*$) and a dimensionless temperature ($T_s^*$) as dimensionless numbers for any radial distance (r), the elapsed time (t) and the underground temperature change ($\Delta T_s$) respectively, the change in dimensionless temperature ($T_s^*$) for the change in Fourier number ($t^*$) for the predetermined dimensionless distance ($r^*$) can be given.

$$\Delta T_s(r,t) = -\frac{2q_{const}}{\pi \lambda_s} I(r,t) \qquad \text{expression (12)}$$

Figure 4A:
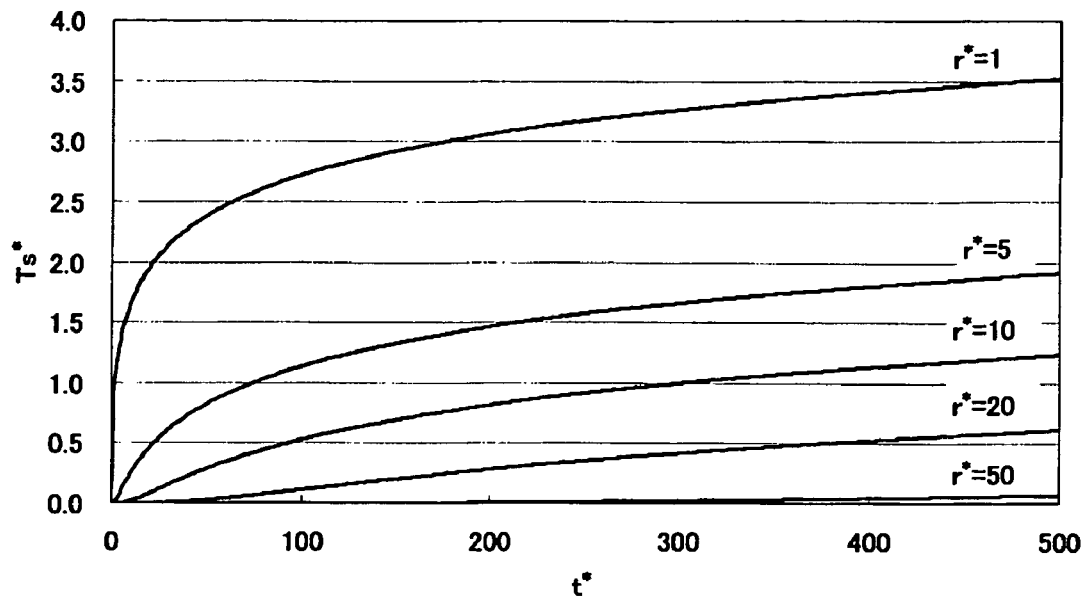
FIG. 4A is a graph of this embodiment illustrating a change in dimensionless temperature for a change in Fourier number (t*)
Figure 4B:
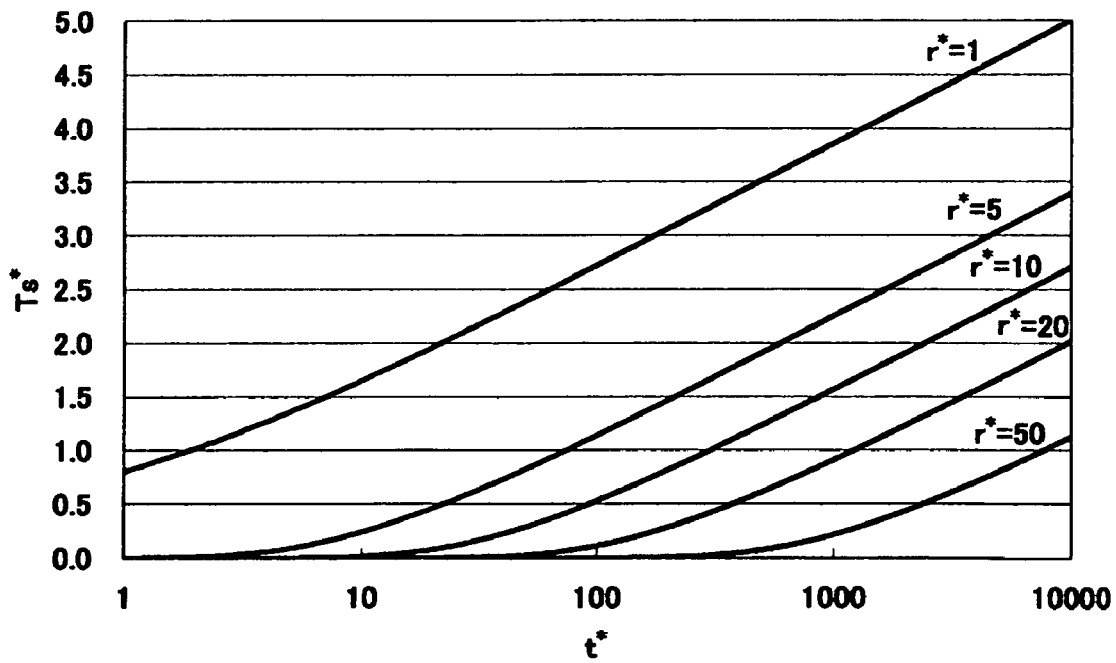
FIG. 4B is a graph of this embodiment illustrating t* of the FIG. 4A on a logarithmic scale.

FIG. 4A shows the changes in the dimensionless temperature ($T_s^*$) for the changes in the Fourier number ($t^*$) for the dimensionless distances ($r^*$) of 1, 5, 10, 20 and 50, and FIG. 4B shows the changes in the dimensionless temperature ($T_s^*$) with the Fourier number ($t^*$) indicated on a logarithmic scale. Here, the dimensionless distance ($r^*$) is calculated by the dimensionless distance calculating means 311, using the following expression (1) stored as arithmetic expression data in the storage device 2.

$$r^* = \frac{r}{r_p} \qquad \text{expression (1)}$$

where $r_p$: radius of buried tube r: radial distance from buried tube

The curves in FIGS. 4A and 4B, with a dimensionless distance ($r^*$) of 1, show the temperature response on a surface of the predetermined buried tube 11. As shown in the FIG. 4A, each curve indicates an almost linear increase in the dimensionless temperature ($T_s^*$) for $t^*$ when this temperature is smaller than 0.5. On the other hand, as shown in the FIG. 4B, the dimensionless temperature ($T_s^*$) shows a linear increase for $t^*$ on a logarithmic scale, when $T_s^*$ exceeds 0.5, as in the curve of the dimensionless distance $r^*=1$. When the Fourier number ($t^*$) is small for a buried tube with a large dimensionless distance ($r^*$), no change in the dimensionless temperature ($T_s^*$) is found. Thus, the underground temperature change for a distance ($r_d$) between said plurality of buried tubes i and j of this embodiment is calculated, as shown in FIG. 5, by dividing the range of the Fourier number ($t^*$) into three segments: a zero segment in which the dimensionless temperature ($T_s^*$) is 0, a linear increase segment in which the dimensionless temperature ($T_s^*$) linearly increases, and a logarithmic increase segment in which the dimensionless temperature ($T_s^*$) logarithmically increases.

By defining the Fourier number $t^*$ bounded by the zero segment and the linear increase segment as a first dimensionless time ($t_1^*$), this first dimensionless time ($t_1^*$) is calculated by the first dimensionless time calculating means 312. More specifically, the first dimensionless time calculating means 312 acquires the following approximate expression (6) stored as arithmetic expression data in the storage device 2, changes the dimensionless time ($t^*$) for $r^*$ on which the dimensionless temperature ($T_s^*$) is smaller than 0.5, and acquires the dimensionless time ($t^*$), which shows the increase in the dimensionless temperature ($T_s^*$) beginning at 0, as the first dimensionless time ($t_1^*$).

$$T_s^*(r^*, t_1^*) \cong 2.8 \exp(-1.73 t_1^{*-0.51} r^*) \qquad \text{expression (6)}$$

The first dimensionless time calculating means 312 may acquire the following expression (7) stored as arithmetic expression data in the storage device 2 and directly calculate the first dimensionless time ($t_1^*$).

$$t_1^* = 0.05 r^{*2} \qquad \text{expression (7)}$$

By defining the Fourier number ($t^*$) bounded by the linear increase segment and the logarithmic increase segment as a second dimensionless time ($t_2^*$), this second dimensionless time ($t_2^*$) is calculated by the second dimensionless time calculating means 313. In a more specific way, the second dimensionless time calculating means 313 acquires the following approximate expression (8) stored as arithmetic expression data in the storage device 2, changes the dimensionless time ($t^*$), and acquires, in an approximate manner, the dimensionless time ($t^*$) as the second dimensionless time ($t_2^*$), at the dimensionless temperature ($T_s^*$) of 0.5.

$$T_s^*(r^*, t_2^*) \cong -1 n(r^*) + T_s^*(1, t_2^*) \qquad \text{expression (8)}$$

The second dimensionless time calculating means 313 may acquire the following expression (9) stored as arithmetic expression data in the storage device 2 and directly calculate the second dimensionless time ($t_2$*).

$$t_2^* = 1.0 r^{*2} \quad \text{expression (9)}$$

The second dimensionless time calculating means 313 of this embodiment, which acquires t* with the dimensionless temperature ($T_s$*) of 0.5 as the second dimensionless time ($t_2$*), is not intended as a definition of the limits of the above description, but any value may be determined if it is found on the boundary area between the linear increase segment and the logarithmic increase segment, and the dimensionless temperature ($T_s$*) may range from 0.3 to 0.7.

Subsequently, the change in the dimensionless temperature ($T_s$*) is divided into the above three segments based on the calculated first dimensionless time ($t_1$*) and second dimensionless time ($t_2$*). The change in the dimensionless temperature ($T_s$*) in the zero segment, with no impact of heat flux therein on the temperature change to be considered, is given by the following approximate expression (13).

$$T_s^*(r^*, t^*) \cong 0 \quad \text{expression (13)}$$

In the temperature response in the linear increase segment, the temperature change can be regarded as constant as time elapses. Thus, the change in the dimensionless temperature ($T_s$*) can be given under the condition of $t_2^* > t^* \geq t_1^*$ by the following approximate expression (14).

$$T_s^*(r^*, t^*) \cong \frac{t^* - t_1^*}{t_2^* - t_1^*} T_s^*(r^*, t_2^*) \quad \text{expression (14)}$$

Moreover, as shown in the FIG. 4B, the change in $T_s$* at t* for any r* linearly increases for t* on a logarithmic scale as in the curve with r*=1, and all the r* curves show almost the same increase pattern. From these observations, the following expression (15) can be given.

$$T_s^*(r^*, t^*) - T_s^*(r^*, t_2^*) \cong T_s^*(1, t^*) - T_s^*(1, t_2^*) \quad \text{expression (15)}$$

Therefore, the change in the dimensionless temperature ($T_s$*) for a dimensionless time $t^* \geq t_2^*$ can be determined by the following approximate expression (16).

$$T_s^*(r^*, t^*) = T_s^*(r^*, t_2^*) + \{T_s^*(r^*, t_2^*) - T_s^*(r^*, t_2^*)\} \quad \text{expression (16)}$$
$$\cong T_s^*(r^*, t_2^*) + \{T_s^*(1, t^*) - T_s^*(1, t_2^*)\}$$

The underground temperature change calculation means 315 of this embodiment calculates an underground temperature change ($\Delta T_s$) for a heat flux (q(t)) on a surface of a given buried tube 11 for any radial distance (r) therefrom by using the above approximate calculating means of the dimensionless temperature ($T_s$*). More specifically, the boundary time acquiring means 314 acquires an elapsed time (t) corresponding to the first dimensionless time ($t^*_1$) as the first boundary time (t') and an elapsed time (t) corresponding to the second dimensionless time ($t^*_2$) as the second boundary time (t"). Then, based on the first and second boundary times t' and t" acquired, the underground temperature change ($\Delta T_s$) is divided into three segments as described above.

First of all, an underground temperature change ($\Delta T_s$) under the condition of t<t' (zero segment) can be given by the following approximate expression (3) based on the above expression (13).

$$\text{where} \quad \text{expression (3)}$$
$$t < t'$$
$$\Delta T_s(r, t) = -\frac{2}{\pi \lambda_s} \int_0^t q(t-\tau) \frac{\partial I(r, \tau)}{\partial \tau} d\tau \cong 0$$

Also, an underground temperature change ($\Delta T_s$) under the condition of $t' \leq t < t"$ (linear increase segment) is given by the following approximate expression (4) based on the above expression (14).

$$\text{where} \quad \text{expression (4)}$$
$$t' \leq t < t"$$
$$\Delta T_s(r, t) = -\frac{2}{\pi \lambda_s} \int_0^{t'} q(t-\tau) \frac{\partial I(r, \tau)}{\partial \tau} d\tau -$$
$$\frac{2}{\pi \lambda_s} \int_{t'}^{t} q(t-\tau) \frac{\partial I(r, \tau)}{\partial \tau} d\tau$$
$$\cong \frac{r_p}{\lambda_s(t-t')} \frac{t-t'}{t"-t'} T_s^*(r^*, t_2^*) \int_{t'}^{t"} q(t-\tau) d\tau$$

An underground temperature change ($\Delta T_s$) under the condition of $t \geq t"$ (logarithmic increase segment) is given by the following approximate expression (5) based on the above expression (16).

$$\text{where} \quad \text{expression (5)}$$
$$t \geq t"$$
$$\Delta T_s(r, t) = -\frac{2}{\pi \lambda_s} \int_0^{t'} a(t-\tau) \frac{\partial I(r, \tau)}{\partial \tau} d\tau -$$
$$\frac{2}{\pi \lambda_s} \int_{t'}^{t"} q(t-\tau) \frac{\partial I(r, \tau)}{\partial \tau} d\tau -$$
$$\frac{2}{\pi \lambda_s} \int_{t'}^{t} q(t-\tau) \frac{\partial I(r, \tau)}{\partial \tau} d\tau$$
$$\cong \frac{r_p}{\lambda_s(t"-t')} T_s^*(r^*, t_2^*) \int_{t'}^{t"} q(t-\tau) d\tau +$$
$$\frac{r_p}{\lambda_s} \int_{t_2^*}^{t^*} q(t^* - \tau^*) \frac{\partial T_s^*(1, \tau^*)}{\partial \tau^*} d\tau^*$$

Here, since the temperature change in an infinite solid like the soil can be regarded as linear, the use of superposition approach in space calculates the underground temperature change ($\Delta T_{si}$) on a surface of one of said plurality of buried tubes 11, in view of the impact of temperature change by other buried tubes 11. To be more specific, the tube surface temperature change calculating means 316, by a summation of the underground temperature changes ($\Delta T_s$) at any point for said plurality of buried tubes calculated by the underground temperature change calculating means 315, calculates changes in the underground temperature on a surface of each buried tube 11.

In this embodiment, to obtain more precise the underground temperature change ($\Delta T_s$), thermal resistance within a borehole, using a single U-shaped tube or double U-shaped tube heat exchanger, is calculated by boundary element method. The method for calculating thermal resistance will be described as follows with reference to the drawings.

FIG. 6A is a sectional view of a borehole using a single U-shaped tube heat exchanger, and FIG. 6B is a sectional view of a borehole using a double U-shaped tube heat exchanger. In this embodiment, the total calculation time will be reduced, by making smaller a calculating area in a boundary area, which is provided with an abiabatic boundary bounded by a symmetrical part thereof. More specifically, as shown in FIG. 6A and FIG. 6B, the boundary area is given by a part within a highlighted full line, in which numbered boundaries 1, 3 and 5 are provided with an abiabatic boundary and numbered boundaries 2 and 4 are provided with a potential boundary in a temperature potential field. Potential values for the boundaries 2 and 4 are set at 1 and 0, respectively, to generate heat transfer therebetween. In fact, this boundary condition of temperature difference of 1 allows for temperature change calculation, even in cases with various temperature differences. Under this boundary conditions, for the single U-shaped tube heat exchanger and the double U-shaped tube heat exchanger, the use of boundary element method obtains a heat flux q for the boundary 2 or 4 in the steady state by changing a U-shaped tube diameter ($d_U$), a borehole diameter ($d_{bo}$), a center distance between a flow pipe and a return pipe ($d_{iU}$), respectively. From this heat flux (q), thermal resistance value within the borehole is calculated. The calculation conditions are shown in FIG. 7.

Figures 9A, 9B:
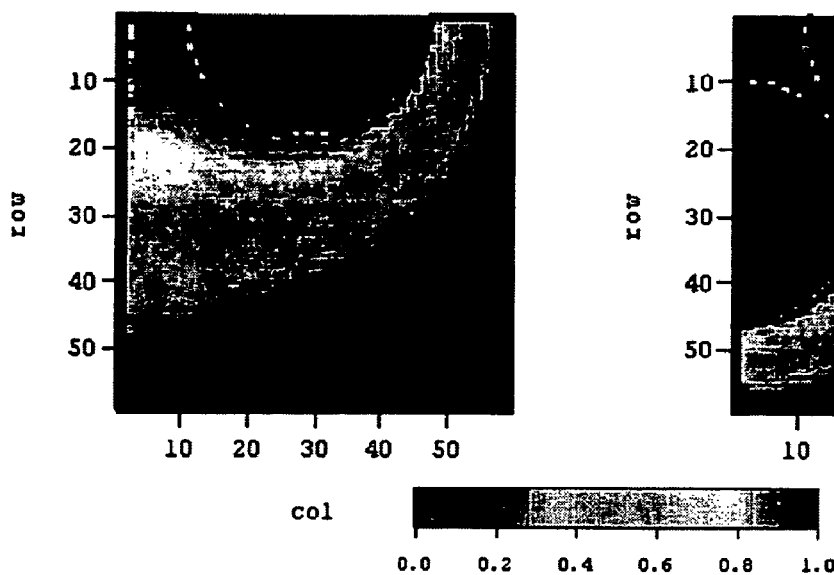
FIG. 9A is a contour figure for the single U-shaped tube heat exchanger of this embodiment.
FIG. 9B is a contour figure for the double U-shaped tube heat exchanger of this embodiment.

On the assumption that a cement filler is used within the borehole, thermal conductivity is set at 1.8 W/(m·K) in the calculation. The calculation results under the above calculation conditions are shown in FIG. 8. Under the calculation condition 1, an inner point temperature is calculated by a step of 1 mm whereby contour figures are prepared for the single U-shaped tube heat exchanger and the double U-shaped tube heat exchanger as shown in FIG. 9A and FIG. 9B, respectively. These contour figures demonstrate favorably simulated heat transfer within the borehole, thereby indicating reliable thermal resistance values within each U-shaped tube.

The calculation results in FIG. 8 show that a thermal resistance value within the borehole is smaller, as the distance between the periphery of the borehole and the periphery of each U-shaped tube becomes shorter. Thus, for the installation of U-shaped tube heat exchangers, by determining the diameter of the U-shaped tube larger relative to the diameter of a borehole and placing U-shaped tubes at a longer interval, thermal resistance within the borehole is reduced, resulting in more heat absorption by heat exchangers.

Next, a thermal resistance value within the borehole as shown in FIG. 8, which is calculated by length, is converted to the value by outer surface area. A thermal resistance ($R_{ub}$) of the U-shaped tube and the heating medium therein by outer surface area thereof is given by the following expression (17).

$$R_{ub} = \frac{1}{r_{u2}\left(\frac{1}{\lambda_u}\ln\frac{r_{u2}}{r_{u1}} + \frac{1}{r_{u1}h_b}\right)} \quad \text{expression (17)}$$

where $r_{u1}$: inner diameter of U-shaped tube $r_{u2}$: outer diameter of U-shaped tube $h_b$: heat transfer coefficient for heating medium $\lambda_u$: thermal conductivity of U-shaped tube A summation of the thermal resistance ($R_{bo}$) within the borehole and this calculated thermal resistance ($R_{ub}$) leads to the calculation of thermal resistance for the part ranging from the heating medium to the surface of the borehole. Consequently, a coefficient of overall heat transmission ($K_p$) by borehole's surface area for the above part in a single U-shaped tube heat exchangers or double U-shaped tube heat exchangers is given by the following expression (18).

$$K_p = \frac{1}{\left(R_{b0} + \frac{A_{b0}}{A_{u2}}r_{u2}\left(\frac{1}{\lambda_u}\ln\frac{r_{u2}}{r_{u1}} + \frac{1}{r_{u1}h_b}\right)\right)} \quad \text{expression (18)}$$

where $A_{u2}$: outer surface area of U-shaped tube $A_{bo}$: surface area of U-shaped tube A heat quantity ($Q_p$) on a surface of a buried tube is given by the following expression (19).

$$Q_p = K_p A_p (T_s|r=r_p - T_b) \quad \text{expression (19)}$$

where $T_s|r=r_p$: underground temperature on a surface of a buried tube $T_b$: temperature of heating medium Thus, a heat flux (q) generated on a surface of the buried tube is given by the following expression (10) as a number obtained by dividing the heat quantity ($Q_p$) on a surface of the buried tube by tube surface area ($A_p$).

$$q = K_p(T_s|_{r=r_p} - T_b) \quad \text{expression (10)}$$

where $$K_p = \frac{1}{\left(R_{bo} + \frac{A_{bo}}{A_{u2}}r_{u2}\left(\frac{1}{\lambda_u}\ln\frac{r_{u2}}{r_{u1}} + \frac{1}{r_{u1}h_b}\right)\right)}$$

$T_s|r=r_p$: underground temperature on a surface of buried tube $T_b$: temperature of heating medium $A_{u2}$: outer surface area of U-shaped tube $A_{bo}$: surface area of borehole $R_{bo}$: thermal resistance within borehole $r_{u1}$: internal radius of U-shaped tube $r_{u2}$: external radius of U-shaped tube $h_b$: convective heat transfer coefficient of heating medium $\lambda_u$: thermal conductivity of U-shaped tube Thus, when the underground temperature change calculating means 315 calculates the change in the underground temperature at any point for a distance ($r_d$) between said plurality of buried tubes using the expressions (3) to (5), this means can acquire more precise change in the underground temperature using the expression (10), in view of properties of a U-shaped tube heat exchanger.

Next, the arithmetic part for system efficiency 32 calculates a coefficient of performance (COP) for the heat pump 13 in the ground source heat pump system 10 and a COP for the entire system. The COP for the heat pump 13 is obtained by dividing an output for the heat pump 13 by power consumption for the heat pump 13. The COP for the entire system is calculated by dividing the output for the heat pump 13 by the sum of the power consumptions for the heat pump 13 and the circulating pump 12.

The arithmetic part for power consumption 33 calculates a power consumption for the ground source heat pump system 10 by dividing a thermal output of the indoor air conditioner 14 by the COP for the heat pump 13 calculated by the arithmetic part for system efficiency 32.

The arithmetic part for amount of carbon-dioxide emission 34 calculates an annual amount of carbon-dioxide emission discharged from the ground source heat pump system 10, by obtaining a power consumption calculated by the arithmetic part for power consumption 33 and by using a predetermined conversion factor. This embodiment employs a conversion factor of 0.48[Kg-$CO_2$/KWh] by Hokkaido Electric Power Co., Inc.

The arithmetic part for running costs 35 calculates an animal running costs for the ground source heat pump system 10, based on prescribed electric utility rates, by obtaining the power consumption calculated by the arithmetic part for power consumption 33. To calculate resulting costs, this embodiment uses the utility rates for snow-melting power by the Hokkaido Electric Power Co., Inc., 1,060 yen for 3-month service and 270 yen for other uses, with a metered rate of 7.67 yen.

The arithmetic part for life cycle 36 calculates a mean annual primary energy consumption, a mean annual amount of carbon-dioxide emission and a mean annual costs for the ground source heat pump system 10 during a certain period of time based on initial costs and equipment life.

Other components in this performance prediction system 1 will be described. The input device 4 comprises a keyboard and a mouse for entering the aforementioned data and command. The working memory 5 comprises random access memories (RAMs), which serve arithmetic processing for the arithmetic processing unit 3 and temporarily store data inputted from the input device 4. The output device 6, comprising e.g. a screen and a printer, displays and prints out calculation results.

Figure 10:
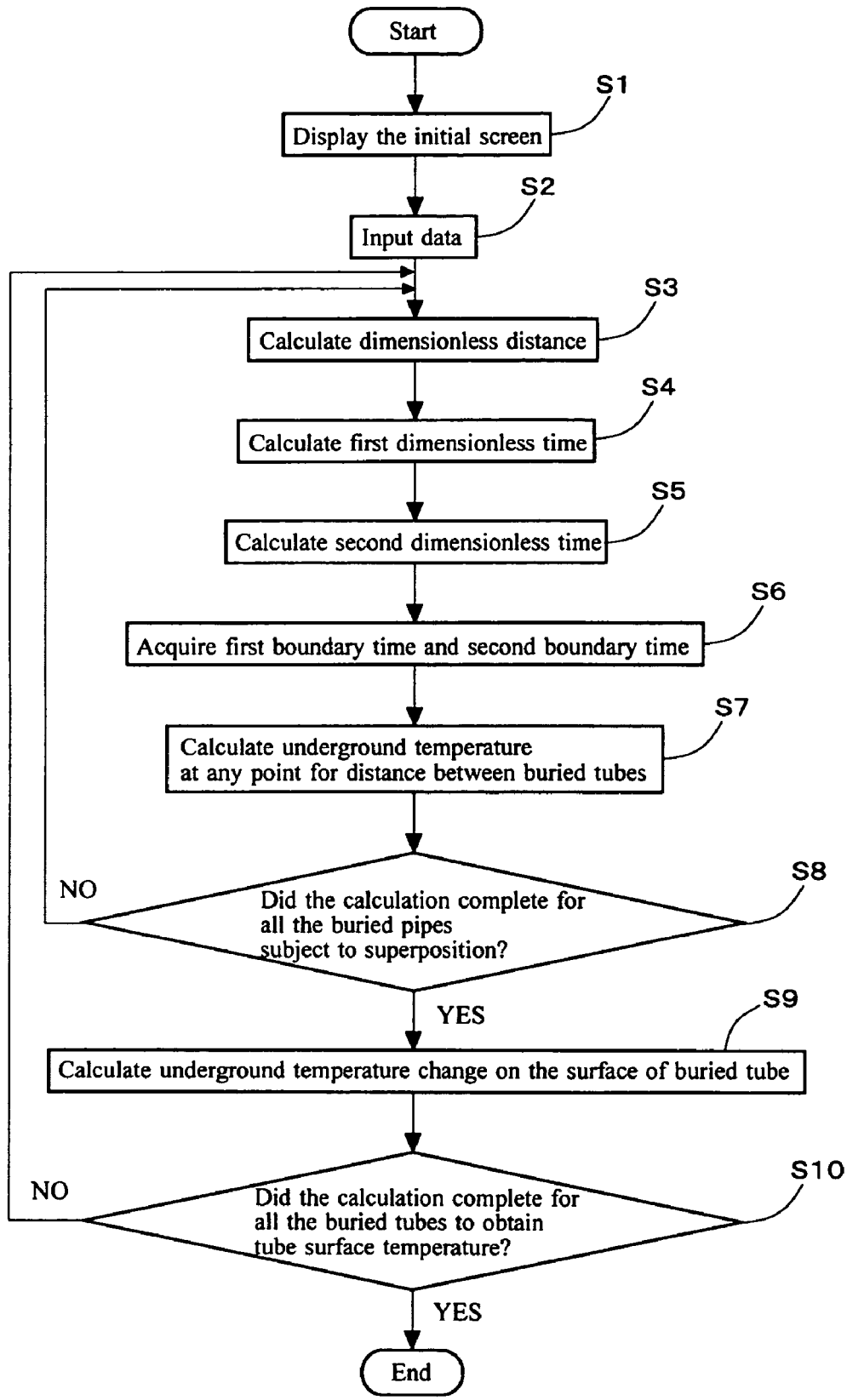
FIG. 10 is a flow chart showing the processing by the performance prediction program of this embodiment.

Subsequently, the operation of the performance prediction system 1 processed by the performance prediction program and the performance prediction method of this embodiment are described with reference to flowcharts in FIGS. 2 and 10.

Figure 11:
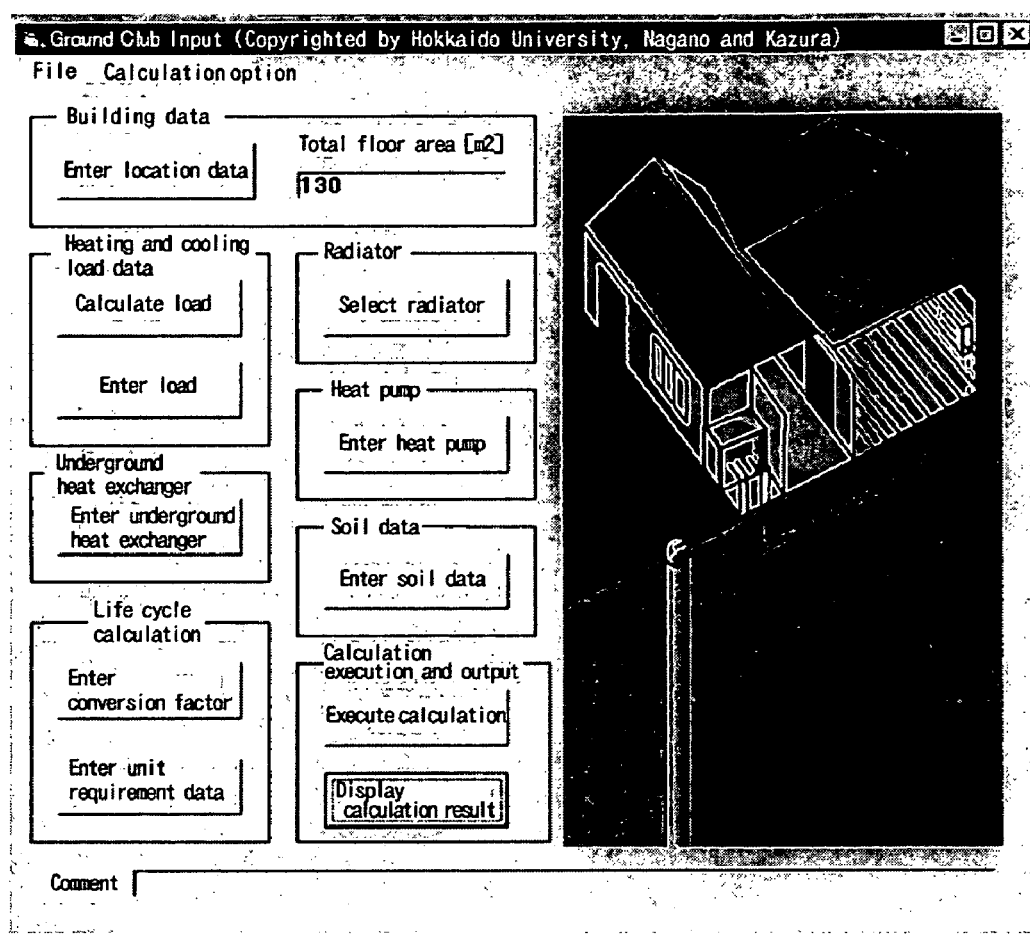
FIG. 11 is an image diagram showing the initial screen for the performance prediction program of this embodiment.
Figure 12:
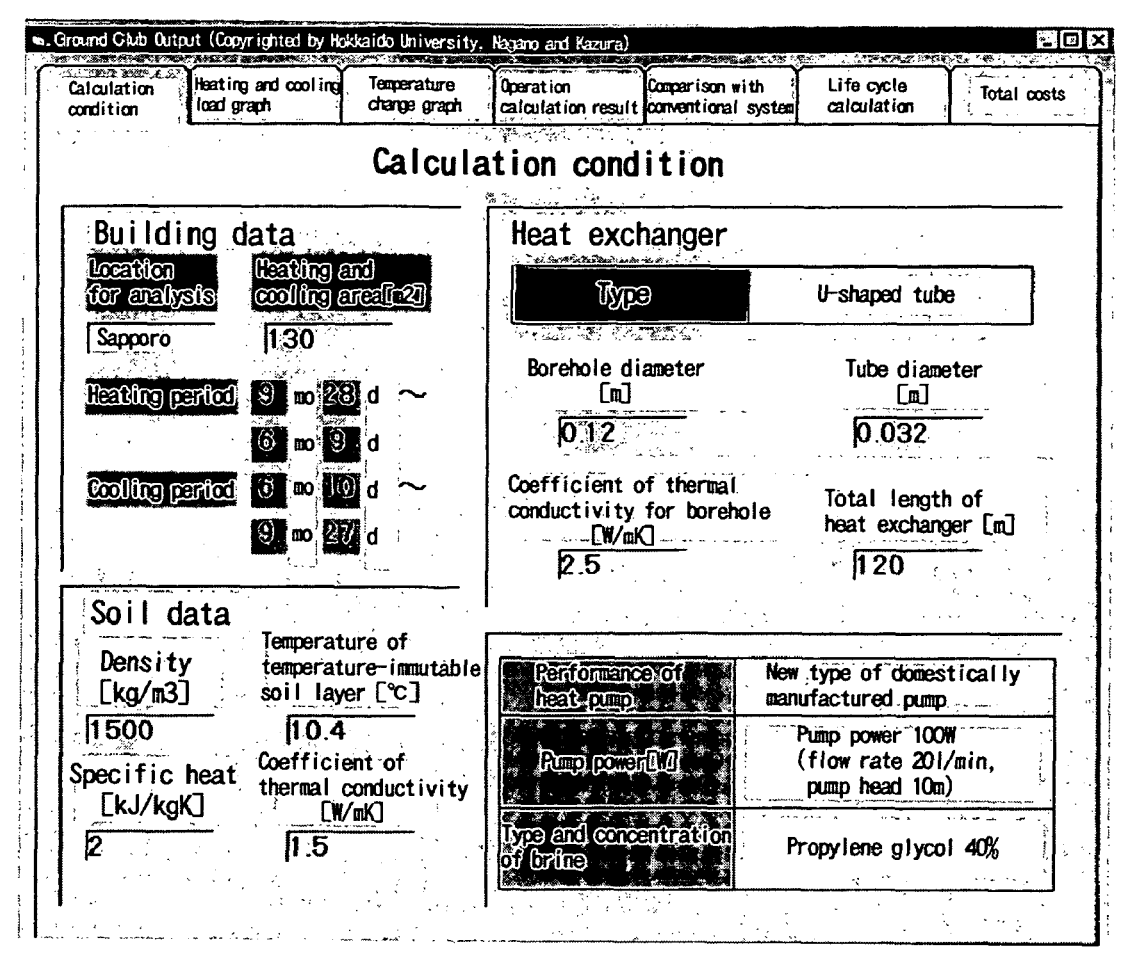

In the performance prediction system 1 of this embodiment which predicts the performance for the ground source heat pump system 10 having heat exchangers comprising a plurality of buried tubes 11, step S1, as shown in FIG. 11, first starts up the performance prediction program and displays the initial screen. Then, step S2 inputs data used for calculation, using the input device 4. In this embodiment, as shown in FIG. 12, building data such as location for analysis, heating and cooling area, heating and cooling periods, and soil data like soil density, soil specific heat, temperature of temperature-immutable soil layer and thermal conductivity are inputted. In addition, heat exchanger data like its type, diameter and thermal conductivity of borehole, diameter of heat exchanger tube and the total length of heat exchanger are inputted. As for the data with regard to the heat pump 13, the type and power of a heat pump, and the type and concentration of brine are inputted. Other data like the distance ($r_d$) between said plurality of buried tubes, and the thermal diffusivity of the soil ($a_s$) are inputted, all of which are stored in the working memory 5.

Next, in step S3, the dimensionless distance calculating means 311 calculates the dimensionless distance ($r^*$) by acquiring the arithmetic expression (1) from the storage device 2 and the radius ($r_p$) of the buried tube and the distance ($r_d$) between said plurality of buried tubes from the working memory 5. The first dimensionless time calculating means 312 in step S4 calculates the first dimensionless time ($t_1^*$) for the dimensionless distance ($r^*$) by acquiring the calculated dimensionless distance ($r^*$) and the arithmetic expression (4) from the storage device 2. In step S5, the second dimensionless time calculating means 313 calculates the second dimensionless time ($t_2^*$) for the dimensionless distance ($r^*$), by acquiring the calculated dimensionless distance ($r^*$) and the arithmetic expression (5) from the storage device 2.

Subsequently, in step S6, the boundary time acquiring means 314 acquires the first dimensionless time ($t_1^*$) and the second dimensionless time ($t_2^*$) and the first boundary time (t') and the second boundary time (t") as elapsed time corresponding to these dimensionless times. The underground temperature change calculating means 315 in step S7 calculates the change in the underground temperature change ($\Delta T_s$) at any point within a distance ($r_d$) between said plurality of buried tubes by acquiring the first boundary time (t') and the second boundary time (t") and acquiring the arithmetic expression (3) from the storage device 2. Step S8 confirms whether the calculation for all of the buried tubes 11 subject to superposition has been completed, and if so (step S8: YES), the process proceeds into step S9. But, if the calculation has not finished, the process will go back to the step S3 (step S8: NO) and repeat the previous processes until the calculation for all the buried tubes 11 completes.

In step S9, the tube surface temperature change calculating means 316 acquires the underground temperature change ($\Delta T_s$) for all the buried tubes 11 calculated in the step S7, and calculates the change in the underground temperature change ($\Delta T_s$) on a surface of a given buried tube 11 by means of superposition principle to obtain the change in the underground temperature change ($\Delta T_s$) on a surface thereof. Step S10 confirms whether the calculation for all of the buried tubes 11 to calculate an underground temperature ($T_s$) on a surface of the tube has been completed, and if so (step S10: YES), the calculation ends. But, if the calculation has not finished, the process will go back to the step S3 (step S10: NO) and repeat the previous process until the calculation for all the buried tubes 11 completes. From these processes, the changes in the underground temperature ($T_s$) on a surface for all of the buried tubes 11 are calculated. This flowchart analysis can predict the performance for the ground source heat pump system, based on the changes in the calculated underground temperature $T_s$.

Next, specific examples of this embodiment will be described. In the following respective examples describing the ground source heat pump system 10 having heat exchangers comprising a plurality of buried tubes 11, the change in underground temperature ($T_s$) on a surface of a buried tube for long-term heat absorption and discharge is calculated. Based on the results, the performance for the ground source heat pump system 10 is evaluated.

The calculation conditions in the examples are shown in FIG. 13. The calculation in the examples is based on the assumption that the buried tubes 11 are installed in Sapporo, a heavy snowfall city. The amount of heat absorption in winter and that of heat discharge in summer are set at 33GJ and 3GJ, respectively. The amounts of heat absorption and discharge are shown by month in FIG. 14, so that heating load (from October through May) and cooling load (from June through September) are distributed on a periodic basis throughout the year. The changes in the underground temperature ($T_s$) by heat absorption using a plurality of the buried tubes 11 in a long-term observation of 60 years are simulated.

Figure 15:
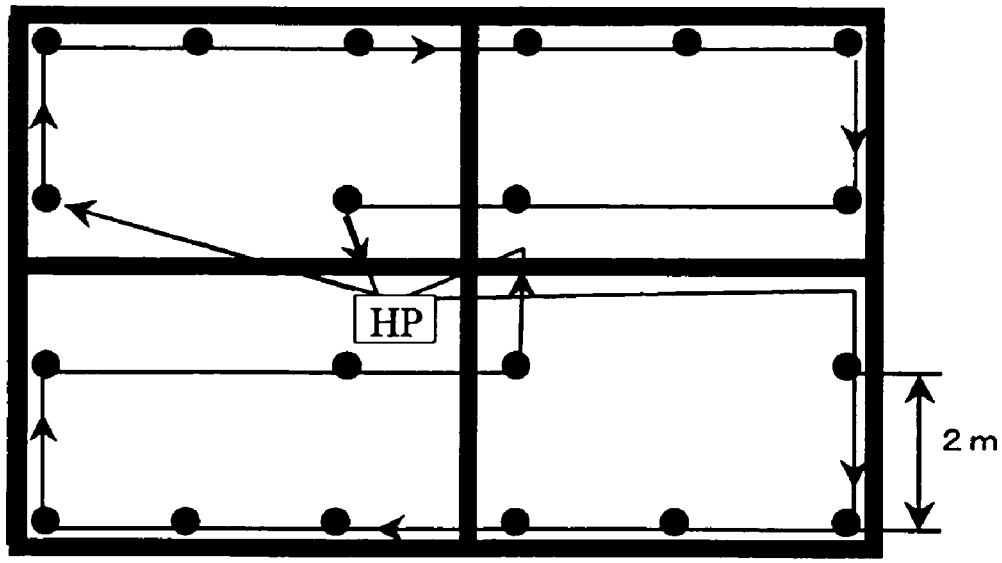
FIG. 15 is a diagram showing the alignment of a plurality of buried tubes for the examples 1 to 3.

In example 1, a heat exchanger model comprises twenty buried tubes 11, foundation pillars with a length of 8 m and an outer diameter of 0.175 m. The buried tubes 11 are aligned, as shown in FIG. 15, with an interval of 2 m. Under the calculation condition of this example 1, changes in mean underground temperature on a surface of a buried tube by month for the $1^{st}$, $2^{nd}$, $3^{rd}$ and $20^{th}$ years are shown in FIG. 16.

Figure 16:
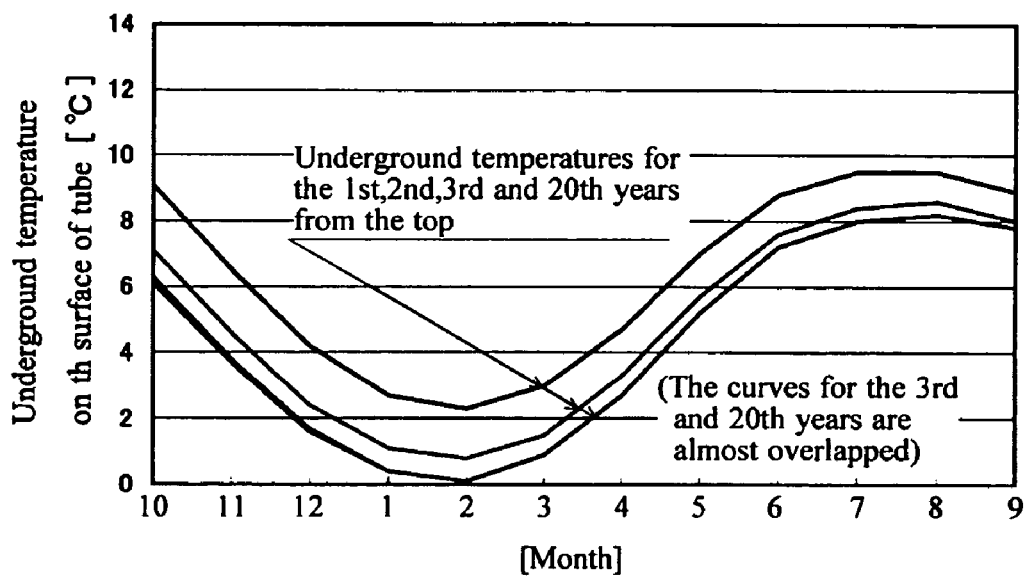
FIG. 16 is a graph showing a change in underground mean temperature on a surface of the buried tube for this example 1.

As shown in the FIG. 16, while a comparison of the underground temperature ($T_s$) on a surface of the buried tube 11 for the $1^{st}$ year and those for the $2^{nd}$ and $3^{rd}$ years yields a temperature decline on a yearly basis, the curves for the $3^{rd}$ and $20^{th}$ years are almost identical. Thus, it is found that according to the condition of the example 1, the underground temperature is affected by heat absorption and discharge with the buried tube 11, and thereafter forms a cyclic pattern in a steady state in about three years. This is attributed to the equilibrium between the total amount of the heat transferred at the upper and lower ends of the buried tubes and the total amount of heat absorption and discharge with the ground by the heat exchangers.

In example 2, a heat exchanger model comprises two single U-shaped tubes installed in a borehole with a length of 80 m and an outer diameter of 0.12 m. Under the calculation condition of this example 2, changes in mean underground temperature on a surface of a buried tube by month for the $1^{st}$, $2^{nd}$, $3^{rd}$ and $20^{th}$ years are shown in FIG. 17.

Figure 17:
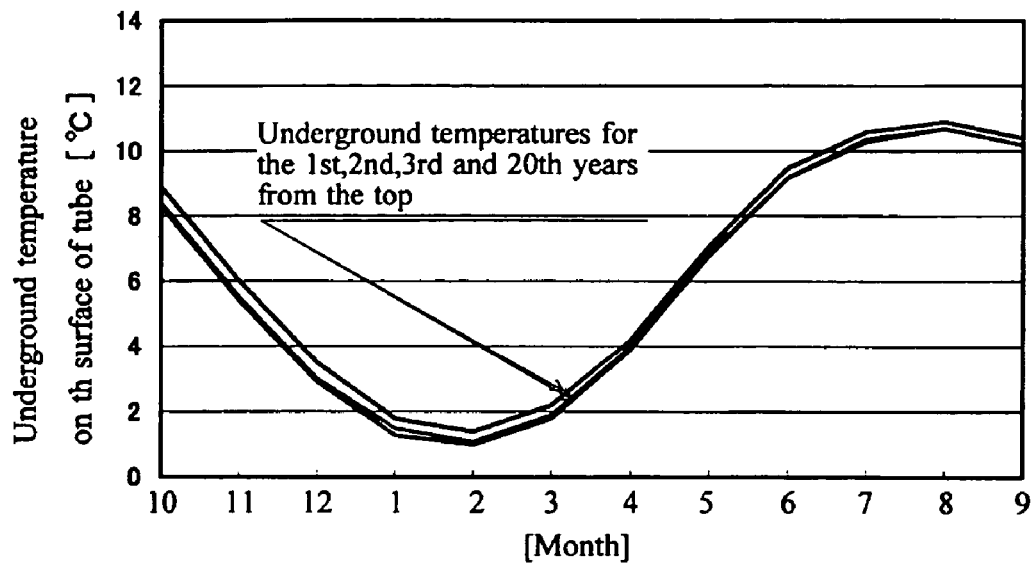
FIG. 17 is a graph showing a change in underground mean temperature on a surface of the buried tube for this example 2.

As shown in FIG. 17, the temperature curves for the $1^{st}$, $2^{nd}$, $3^{rd}$ and $20^{th}$ years are almost overlapped, causing no temperature decline on a yearly basis. This observation demonstrates that the use of one long buried tube 11 contributes to little decline in underground temperature ($T_s$), even if a long-term heat absorption and discharge is found. This means that a single tube is characterized by a small variation in the underground temperature $T_s$ in a long-term observation due to a strong recovery of temperature of the soil infinitely existing around the buried tubes. On the other hand, if a plurality of buried tubes installed in the ground with a small interval have a significant difference between the amounts of heat absorption and discharge, the impact of heat absorption declines the underground temperature ($T_s$) in the surrounding area, particularly at centrally-located buried tubes. The resulting no heat transfer from the ground further declines the underground temperature ($T_s$), thereby generating a long-term increase or decrease in underground temperature.

Figure 18:
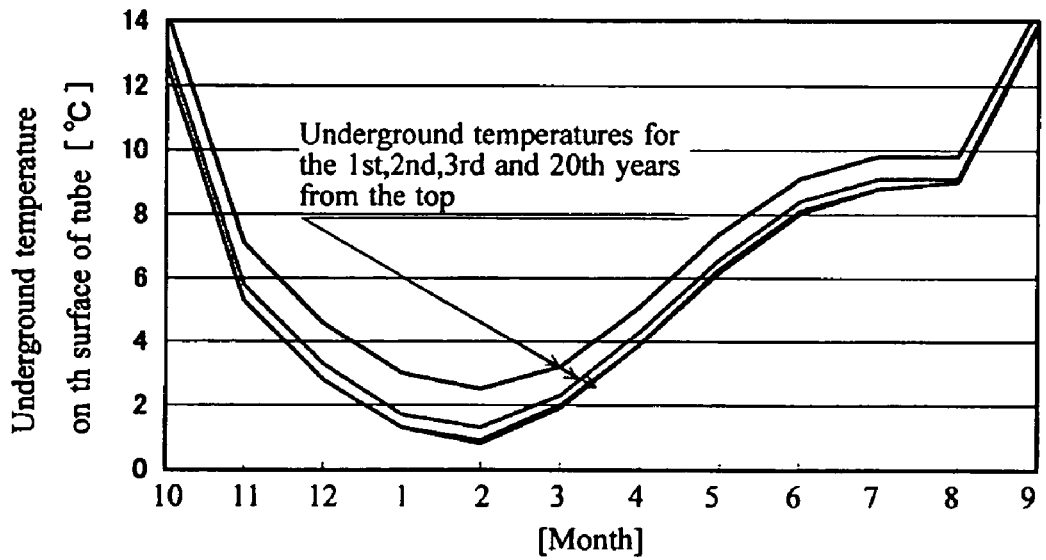
FIG. 18 is a graph showing a change in underground mean temperature on a surface of the buried tube for this example 3.

In example 3, the use of a heat exchanger model considers heat discharge of 5GJ in September in which the cooing period ends and also in October in which the heating period starts, along with the calculation condition of the example 1. Under the calculation condition of this example 3, changes in mean underground temperature on a surface of a buried tube by month for the $1^{st}$, $2^{nd}$, $3^{rd}$ and $20^{th}$ years are shown in FIG. 18.

The comparison of the results of this example 3 and those of the example 1 shows that the mean ground temperature on a surface of a buried tube in the example 3 during the heating period (from October through May) for the $20^{th}$ year is 2.2 degrees C. higher than in the example 1. This observation provides a new finding describing the inhibition of reduction in underground temperature, brine temperature and coefficient of performance (COP) for the heat pump 13 by heat discharge in summer. The methods for discharging heat into the ground are generally to use exhaust heat discharged from cooling equipment and solar collectors.

For the heat exchangers with a short length of 8 m in the aforementioned examples 1 and 3, a radius is corrected by the introduction of a correction factor due to a profound impact of heat transfer at both upper and lower ends of the buried tubes. More specifically, changes in the underground temperature ($T_s$) on a surface of the buried tube generated by heat absorption and discharge of the actual heat exchanger, which are affected by heat transfer at both ends of buried tubes, are smaller than those for underground heat exchangers comprising infinite cylinders. Also, since the underground temperature change is smaller at a point farther away from the buried tube 11, providing a radius in consideration of a correction factor C for a smaller temperature change will give the same temperature change as the mean tube surface temperature for the actual heat exchangers. The correction factor C used in this example is calculated by the following approximate expression (20) by supposing that the end of the buried tube on the ground surface side is provided with an insulation requirement.

$$C = 1.00 + 0.742 \ Ln(1.103t^{**} + 1.162) - 0.117 \quad \text{expression (20)}$$

$t^{**}$ is dimensionless number by length of the buried tube 11 which is obtained by multiplying the Fourier number $t^*$ by the square of $(r/L)$. r is radius of the buried tube and L is the length of the buried tube.

According to the above descriptions, this embodiment can efficiently and immediately predict the underground temperature change at any point, which has not been achieved conventionally, in view of the use of a plurality of buried tubes installed in the ground, underground temperature change patterns for buried tubes placed at different intervals, and the use of U-shaped tube heat exchangers. Consequently, based on various conditions concerning the area and building for installing the ground source heat pump system 10 and soil properties, the diameter, length, number and layout for the buried tube 11 can be evaluated to improve short- and long-term energy efficiency and cost effectiveness. Also, the impact of new technologies on the performance for the ground source heat pump system 10 can be estimated.

The performance prediction program and performance prediction system 1 for the ground source heat pump system of this invention is not intended as a definition of the limits of the above described embodiment, but may be modified accordingly. For example, the performance prediction program and performance prediction system 1 may be stored in one identical enclosure, or different enclosures according to respective functions. Moreover, calculating means such as the boundary time acquiring means 314 is not necessarily limited to the calculation using arithmetic expressions. For example, data tables may be prepared beforehand and stored in the storage device 2, from which data corresponding to a specific input value may be directly acquired.

What is claimed is:

1. A performance prediction program stored on a non-transitory computer readable medium for a ground source heat pump system having a plurality of buried tubes as heat exchangers and which when executed by a computer enables the computer to predict performance of a ground source heat pump system, wherein the program comprises:

a dimensionless distance calculating means for calculating a dimensionless distance ($r^*$) by non-dimensionalizing a radial distance (r) from one of said plurality of buried tubes using the following expression (1);

$$r^* = \frac{r}{r_p} \quad \text{expression (1)}$$

where $r_p$ : radius of buried tube $r$ : radius distance from buried tube a first dimensionless time calculating means for non-dimensionalizing the following expression (2) using a dimensionless time ($t^*$) equal to $a_s t / r_p^2$ obtained by non-dimensionalizing an elapsed time (t) and using a dimensionless temperature (Ts*) equal to $\lambda_s \Delta T/(r_p \cdot q_{const})$ obtained by non-dimensionalizing an underground temperature change ($\Delta T_s$) at t* under the condition of a constant heat flux of $q_{const}$ when said underground temperature change generated by the change in heat flux (q(t)) on a surface of a predetermined one of said plurality of buried tubes for any distance (r) therefrom within said elapsed time is given by said expression (2) obtained by superposition principle of Duhamel's theorem, and for calculating a first dimensionless time (h*) bounded by a zero segment in which said dimensionless temperature shows no change for said dimensionless distance and a linear increase segment in which said dimensionless temperature linearly increases for said dimensionless time;

$$\Delta T_s(r, t) = -\frac{2}{\pi \lambda_s} \int_0^t q(t-\tau) \frac{\partial I(r, \tau)}{\partial \tau} d\tau \quad \text{expression (2)}$$

where $$I(r, t) = \quad \text{expression (2)}$$
$$\int_0^\infty (1 - e^{-a_s u^2 t}) \frac{J_0(ur)Y_1(u r_q) - Y_0(ur)J_1(u r_q)}{u^2 [J_1^2(u r_q) + Y_1^2(u r_q)]} du$$

$a_s$ : thermal diffusivity of the soil
$q$ : heat flux on the surface of buried tube
$\lambda_s$ : thermal conductivity of the soil
$u$ : eigenvalue
$J_x$ : the X root of the Bessel function of the first kind
$Y_x$ : the X root of the Bessel function of the second kind
$\tau$ : time variant a second dimensionless time calculating means for calculating a second dimensionless time ($t_2^*$) bounded by a logarithmic increase segment in which said dimensionless temperature for said dimensionless distance logarithmically increases and said linear increase segment;

a boundary time acquiring means for obtaining an elapsed time corresponding to said first dimensionless time as a first boundary time (t) and an elapsed time corresponding to said second dimensionless time as a second boundary time (t");

an underground temperature change calculating means for acquiring said first boundary time and said second boundary time, and for calculating said underground temperature change at any point for said plurality of buried tubes by the following approximate expressions (3) to (5); and where t<t'

$$\Delta T_s(r, t) = -\frac{2}{\pi \lambda_s} \int_0^t q(t-\tau) \frac{\partial I(r, \tau)}{\partial \tau} d\tau \cong 0 \quad \text{expression (3)}$$

where t'≦t<t"

$$\Delta T_s(r, t) = -\frac{2}{\pi \lambda_s} \int_0^{t'} q(t-\tau) \frac{\partial I(r, \tau)}{\partial \tau} d\tau - \quad \text{expression (4)}$$

-continued $$\frac{2}{\pi \lambda_s} \int_{t'}^t q(t-\tau) \frac{\partial I(r, \tau)}{\partial \tau} d\tau$$
$$\cong \frac{r_p}{\lambda_s(t-t'')} \frac{t-t'}{t''-t'} T_s^*(r^*, t_2^*) \int_{t^*}^{t''} q(t-\tau) d\tau$$

where t≧t"

$$\Delta T_s(r, t) = -\frac{2}{\pi \lambda_s} \int_0^{t''} q(t-\tau) \frac{\partial I(r, \tau)}{\partial \tau} d\tau -$$
$$\frac{2}{\pi \lambda_s} \int_{t'}^{t''} q(t-\tau) \frac{\partial I(r, \tau)}{\partial \tau} d\tau - \frac{2}{\pi \lambda_s} \int_{t''}^t q(t-\tau) \frac{\partial I(r, \tau)}{\partial \tau} d\tau$$

a tube surface temperature change calculating means for calculating an underground temperature change on a surface of said plurality of buried tubes by a summation of said underground temperature changes for respective buried tubes.

2. The performance prediction program for the ground source heat pump system set forth in claim 1, wherein:
said first dimensionless time calculating means acquires said first dimensionless time ($t_1^*$) based on the following approximate expression (6)

$$T_s(r^*, t_1^*) \cong 2.8 \exp(-1.73 t_1^{*-0.51} r^*) \quad \text{expression (6)}.$$

3. The performance prediction program for the ground source heat pump system set forth in claim 1, wherein:
said first dimensionless time calculating means directly acquires said first dimensionless time ($t_1^*$) based on the following expression (7)

$$t_1^* = 0.05 r^2 \quad \text{expression (7)}.$$

4. The performance prediction program for the ground source heat pump system set forth in claim 1, wherein:
said second dimensionless time calculating means acquires said second dimensionless time ($t_2^*$) based on the following approximate expression (8)

$$T_s^*(r^*, t_2^*) \cong -\ln(r^*) + T_s^*(1, t_2^*) \quad \text{expression (8)}.$$

5. The performance prediction program for the ground source heat pump system set forth in claim 1, wherein:
said second dimensionless time calculating means directly acquires said second dimensionless time ($t_2^*$) based on the following expression (9)

$$t_2^* = 1.0 r^{*2} \quad \text{expression (9)}.$$

6. The performance prediction program for the ground source heat pump system set forth in claim 1, wherein:
a heat flux (q) on a surface of one of said plurality of buried tubes is calculated based on the following expression (10) if said heat exchangers are U-shaped tube heat exchangers $$q = K_p(T_s|_{r=r_p} - T_b) \quad \text{expression (10)}$$

where $$K_p = \frac{1}{\left( R_{bo} + \frac{A_{bo}}{A_{u2}} r_{u2} \left( \frac{1}{\lambda_u} \ln \frac{r_{u2}}{r_{u1}} + \frac{1}{r_{u1} h_b} \right) \right)}$$

$T_s|_{r=r_p}$: underground temperature on a surface of buried tube
$T_b$: temperature of heating medium $A_{u2}$: outer surface area of U-shaped tube
$A_{bo}$: surface area of borehole
$R_{bo}$: thermal resistance within borehole
$r_{u1}$: internal radius of U-shaped tube
$r_{u2}$: external radius of U-shaped tube
$h_b$: convective heat transfer coefficient of heating medium
$\lambda_u$: thermal conductivity of U-shaped tube.

7. A performance prediction system for a ground source heat pump system having a plurality of buried tubes as heat exchangers, comprising:
  a dimensionless distance calculating means for calculating a dimensionless distance (r*) by non-dimensionalizing a radial distance (r) from one of said plurality of buried tubes using the following expression (1);

$$r^* = \frac{r}{r_p} \qquad \text{expression (1)}$$

where $r_p$: radius of buried tube
r: radial distance from buried tube
a first dimensionless time calculating means for non-dimensionalizing the following expression (2) using a dimensionless time (t*) equal to $a_s t/r_p^2$ obtained by non-dimensionalizing an elapsed time (t) and using a dimensionless temperature ($T_s$*) equal to $\lambda_s \Delta T/(r_p \cdot q_{const})$ obtained by non-dimensionalizing an underground temperature change ($\Delta T_s$) at t* under the condition of a constant heat flux of $q_{const}$ when said underground temperature change generated by the change in heat flux (q(t)) on a surface of a predetermined one of said plurality of buried tubes for any distance (r) therefrom within said elapsed time is given by said expression (2) obtained by superposition principle of Duhamel's theorem, and for calculating a first dimensionless time ($t_1$*) bounded by a zero segment in which said dimensionless temperature shows no change for said dimensionless distance and a linear increase segment in which said dimensionless temperature linearly increases for said dimensionless time;

$$\Delta T_s(r,t) = -\frac{2}{\pi \lambda_s} \int_0^t q(t-\tau) \frac{\partial I(r,\tau)}{\partial \tau} d\tau \qquad \text{expression (2)}$$

where
$$I(r,t) = \int_0^\infty \left(1 - e^{-a_s x^2 t_i}\right) \frac{J_0(ur)Y_1(ur_p) - Y_0(ur)J_1(ur_p)}{u^2 [J_1^2(ur_p) + Y_1^2(ur_p)]} du$$

$a_1$: thermal diffusivity of the soil
q: heat flux on the surface of buried tube
$\lambda_s$: thermal conductivity of the soil
u: eigenvalue
$J_X$: the X root of the Bessel function of the first kind
$Y_X$: the X root of the Bessel function of the second kind
$\tau$: time variant
  a second dimensionless time calculating means for calculating a second dimensionless time ($t_2$*) bounded by a logarithmic increase segment in which said dimensionless temperature for said dimensionless distance logarithmically increases and said linear increase segment;
  a boundary time acquiring means for obtaining an elapsed time corresponding to said first dimensionless time as a first boundary time (t') and an elapsed time corresponding to said second dimensionless time as a second boundary time (t");
  an underground temperature change calculating means for acquiring said first boundary time and said second boundary time, and for calculating said underground temperature change at any point for said plurality of buried tubes by the following approximate expressions (3) to (5); and where expression (3)
$t < t'$
$$\Delta T_s(r,t) = -\frac{2}{\pi \lambda_s} \int_0^t q(t-\tau) \frac{\partial I(r,\tau)}{\partial \tau} d\tau \cong 0$$
where
$t' \leq t < t''$ expression (4)
$$\Delta T_s(r,t) = -\frac{2}{\pi \lambda_s} \int_0^{t'} q(t-\tau) \frac{\partial I(r,\tau)}{\partial \tau} d\tau -$$
$$\frac{2}{\pi \lambda_s} \int_{t'}^t q(t-\tau) \frac{\partial I(r,\tau)}{\partial \tau} d\tau$$
$$\cong \frac{r_p}{\lambda_s(t-t')} \frac{t-t'}{t''-t'} T_s^*(r^*, t_2^*) \int_{t'}^{t''} q(t-\tau) d\tau$$

where $t \geq t''$ expression (5)
$$\Delta T_s(r,t) = -\frac{2}{\pi \lambda_s} \int_0^{t'} q(t-\tau) \frac{\partial I(r,\tau)}{\partial \tau} d\tau - \frac{2}{\pi \lambda_s} \int_{t'}^{t''} q(t-\tau)$$
$$\frac{\partial I(r,\tau)}{\partial \tau} d\tau - \frac{2}{\pi \lambda_s} \int_{t''}^t q(t-\tau) \frac{\partial I(r,\tau)}{\partial \tau} d\tau$$
$$\cong \frac{r_p}{\lambda_s(t''-t')} T_s^*(r^*, t_2^*) \int_{t'}^{t''} q(t-\tau) d\tau +$$
$$\frac{r_p}{\lambda_s} \int_{t'}^{t''} q(t^* - \tau^*) \frac{\partial T_s^*(1, \tau^*)}{\partial \tau^*} d\tau^*$$

a tube surface temperature change calculating means for calculating an underground temperature change on a surface of said plurality of buried tubes by a summation of said underground temperature changes for respective buried tubes.

8. The performance prediction system for the ground source heat pump system set forth in claim 7, wherein:
a heat flux (q) on a surface of each of said plurality of buried tubes is calculated based on the following expression (10) if said heat exchangers are U-shaped tube heat exchangers $$q = K_p\left(T_s|_{r=r_p} - T_b\right) \qquad \text{expression (10)}$$
where
$$K_p = \frac{1}{\left(R_{bo} + \frac{A_{bo}}{A_{u2}} r_{u2}\left(\frac{1}{\lambda_u} \ln \frac{r_{u2}}{r_{u1}} + \frac{1}{r_{u1} h_b}\right)\right)}$$

$T_s|r=r_p$: underground temperature on a surface of buried tube
$T_b$: temperature of heating medium
$A_{u2}$: outer surface area of U-shaped tube
$A_{bo}$: surface area of borehole
$R_{bo}$: thermal resistance within borehole $r_{u1}$: internal radius of U-shaped tube
$r_{u2}$: external radius of U-shaped tube
$h_b$: convective heat transfer coefficient of heating medium
$\lambda_u$: thermal conductivity of U-shaped tube.

* * * * *